United States Patent [19]

Muirhead

[11] 3,718,616
[45] Feb. 27, 1973

[54] HIGH IMPACT POLYVINYL-AROMATIC COMPOSITIONS
[75] Inventor: Leslie A. Muirhead, Wilmslow, England
[73] Assignee: Shell Oil Company, New York, N.Y.
[22] Filed: April 14, 1971
[21] Appl. No.: 134,054

Related U.S. Application Data

[63] Continuation-in-part of Ser. No. 759,523, Sept. 12, 1968, abandoned.

[30] Foreign Application Priority Data

Nov. 10, 1968 Australia....................................44670

[52] U.S. Cl........260/28.5 B, 260/33.6 A, 260/880 R
[51] Int. Cl............................C08f 45/28, C08f 45/52
[58] Field of Search ....260/28.5 A, 28.5 B, 880, 892, 260/33.6 A; 759/523

[56] References Cited

UNITED STATES PATENTS 3,428,712  2/1969  Carrock et al........................260/880

OTHER PUBLICATIONS

The Condensed Chemical Dictionary, Van Nustrand Reinhold Co., page 672 relied on Primary Examiner—Morris Liebman
Assistant Examiner—S. L. Fox
Attorney—Ronald R. Reper and Martin S. Baer

[57] ABSTRACT

The impact strength of polyvinyl-aromatic compositions such as impact polystyrene is appreciably increased by the addition of at least 13 percent weight of petroleum jelly.

6 Claims, No Drawings

HIGH IMPACT POLYVINYL-AROMATIC COMPOSITIONS

This case is a continuation-in-part of my copending application, Ser. No. 759,523, filed Sept. 12, 1968, now abandoned.

The present invention is concerned with thermoplastic polymers which are polyvinyl-aromatic compositions having improved toughness and flow properties; the present invention is also concerned with the manufacture of such polyvinyl-aromatic compositions, and with articles formed therefrom, for example by injection molding.

It is known that the impact strength of polyvinyl-aromatic compounds, for example, polystyrene can be improved by incorporating therein an elastomeric component by processes which involve polymerizing vinyl-aromatic monomer in admixture with an elastomer such as polybutadiene. The resulting toughened polyvinyl-aromatic composition contains the elastomeric component or a substantial proportion thereof as an interpolymer or graft polymer, and it is with such toughened polyvinyl-aromatic compositions that the present invention is concerned. A number of methods for making such toughened polyvinyl-aromatic compositions are known, which employ an interpolymerization technique to make at least the major proportion of the ultimate polymer product.

It is also well known that the flow properties of a polyvinyl-aromatic compound can be improved by the addition thereto of a small amount of a lubricant such as a mineral oil or an ester lubricant, e.g., butyl stearate, or a paraffin wax. Flow properties are of particular importance when injection molding articles having relatively thin sections. Hitherto up to about 6 percent to 7 percent by weight, of added lubricant has been found in the art to be fully adequate for this purpose and also for the purpose of a flow promoter to increase the speed with which moldings can be made.

Surprisingly, it has now been found, in accordance with the present invention, that the addition to a toughened polyvinyl-aromatic composition of at least 13 percent by weight, of petroleum jelly can enhance both the flow properties and the strength characteristics thereof without affecting other essential characteristics, particularly the softening point, of the resulting toughened polyvinyl-aromatic composition to an undesirable extent. For example, it has been found that thin-walled containers can be formed rapidly by injection molding from a toughened polystyrene containing 14 to 17 percent by weight, of a petroleum jelly, and that such containers can be crushed without cracking or breaking.

According to the present invention a process for manufacturing a polymer composition comprising a toughened polyvinyl-aromatic composition, comprises forming a blend of said toughened polyvinyl-aromatic composition and a lubricant additive comprising at least 13 percent, preferably at least 14 percent by weight of the total composition, of a petroleum jelly. The amount of lubricant in the resulting polymer composition is preferably such that its softening point is not lower than 70° C. The present invention also includes the resulting polymer compositions.

Further according to the present invention a polymer composition comprises a composition having improved flow properties and impact strength comprises (1) a graft copolymer containing a major amount of a poly(monovinyl-aromatic) compound and a minor amount of a synthetic conjugated diene elastomer and (2) from 13 to 17 percent by weight on the composition of a lubricant selected from petroleum jelly and petroleum jelly together with up to 40 percent by weight on petroleum jelly of a mineral oil.

A petroleum jelly (also known as petrolatum) is a microcrystalline wax associated with a minor amount, for example, 2 to 10 percent, by weight, of oil, and it has a setting point between 60 and 93° C; the setting point is the temperature at which the molten petroleum jelly begins to solidify. The words "forming a blend" and "blended" are used herein to signify the achievement of an essentially homogeneous dispersion of the petroleum jelly within the toughened polyvinyl-aromatic composition. This can be achieved by mixing these two components together or, preferably, by incorporating the petroleum jelly in the toughened polyvinyl-aromatic during the polymerization stage in the manufacture thereof, for example, by polymerizing at least one vinyl-aromatic monomer containing dissolved elastomer and petroleum jelly.

A polymer composition in accordance with the present invention preferably comprises a petroleum jelly as the sole lubricant additive. However, it has also been found possible to replace a minor proportion thereof with a mineral oil, said mineral oil being an additional lubricant component in the sense that it constitutes an amount of oil in excess of that forming part of the petroleum jelly component. Accordingly, it is feasible to form a polymer composition in accordance with the present invention by blending a petroleum jelly with a toughened polyvinyl-aromatic composition such as an impact polystyrene which already contains a small amount, for example, up to 4 percent, by weight thereof of a mineral oil, providing the total amount of mineral oil and petroleum jelly in the resulting polymer composition is at least 13 percent, preferably at least 14 percent by weight thereof.

The present invention therefore also included a process for manufacturing a polymer composition which is a modification of the process defined above, and a polymer composition which is a modification of the polymer composition defined above, wherein the lubricant additive comprises petroleum jelly and a mineral oil, the proportion of said mineral oil being not more than 40 percent, by weight of the petroleum jelly, and the total amount of said lubricant additive being at least 13 percent, and preferably at least 14 percent, by weight of the total composition.

The mineral oil is preferably a hydrocarbon oil having a boiling point above about 550° F, a viscosity in the range between about 40 and 250 SSU at 210°F and a low aromatic content, e.g., below about 10 percent by weight.

Said mineral oil can be present in a toughened polyvinyl-aromatic composition which is blended with petroleum jelly to form a polymer composition in accordance with the present invention, or said mineral oil and said petroleum jelly can be incorporated in a toughened polyvinyl-aromatic composition during the manufacture thereof.

The monovinyl-aromatic compounds which can be employed as monomers in producing the rubber toughened polymers of this invention include monovinyl-aromatic compounds having the vinyl radical attached directly to a carbon atom of the aromatic nucleus. Styrene and mixtures thereof with minor amounts (e.g., 5—35 percent by weight) of alpha-methylstyrene are preferred. Examples of other monovinyl-aromatic compounds applicable in preparing the toughened poly(monovinyl-aromatic) compositions according to the invention are alkyl and halogen derivatives of styrene such as ortho, meta and para methylstyrenes, para, meta and ortho ethylstyrenes, para-isopropylstyrene, ortho, para and meta dichlorostyrenes, ar-dimethyl styrenes, para-bromostyrene, para-fluorostyrene, alpha-methyl-styrene, 1,3 methoxy styrene, para-tertiary butyl-styrene, ar-dimethyl-alpha-methyl styrene, 3,4-dichloromethyl styrene and mixtures of these compounds with each other, or with styrene.

For purposes of convenience, the invention will be hereinafter described in detail with styrene as the monovinyl-aromatic compound. However, it will be understood that other monovinyl-aromatic compounds or mixtures of monovinyl-aromatic compounds such as listed above, may be used in preparing the novel toughened polyvinyl-aromatic compositions of this invention.

A particular, and indeed unexpected, advantage of the polymer compositions of the present invention is that they exhibit outstanding flow properties in an injection molding process and yet can have softening points which are appreciably higher than one would anticipate having regard to the known softening point lowering effect of conventional lubricants such as mineral oils and esters of the butyl stearate type. Also, thin-walled articles such as containers molded from the polymer compositions of the present invention have a good resistance to breakage and yet have acceptable softening points. Further, their ability to accept printing ink is not impaired by the presence of the petroleum jelly in the polymer composition.

It has now been found that these advantages are the result of selecting more than 13 percent and preferably more than 14 percent by weight, of petroleum jelly (or petroleum jelly together with mineral oil as described above) as a lubricant additive in a toughened polystyrene in which the elastomeric component is in an interpolymerized or grafted form, and in the latter respect it is noted that a toughened polystyrene in which the elastomeric component is simply present in physical admixture with polystyrene gives inferior results even when using such large amounts of the selected lubricant.

Since it is known that smaller amounts of conventional lubricants improve the flow properties and flexibility of polystyrene it might be thought that a further improvement in this respect might be achieved simply by increasing the amount of conventional lubricant added. However, unacceptable difficulties arise in regard to other properties of the polystyrene if one attempts to do this; the most serious being in relation to softening point. A large number of potential lubricant additives added at various concentrations of a toughened polystyrene prepared by graft copolymerization of styrene monomer on the elastomer and which already contained 2 percent, by weight, of a lubricant, were investigated to determine the influence of these additives on (1) the processing viscosity and softening point of the toughened polystyrene, (2) the impact strength thereof, and (3) other properties which are important in regard to the end-use of the polymer composition, for example, printability and appearance, compatibility of the additive, and the ability of the compositions to form acceptable moldings. The additives included conventional lubricants such as oils (mineral oil and palm kernel oil) and esters (butyl stearate, stearyl stearate and dicyclohexyl stearate) as well as paraffin wax, which although known as a lubricant is not a conventional lubricant in the art, microcrystalline wax, and petroleum jelly. The softening point depression caused by the addition of various amounts of these additives to the toughened polystyrene was determined by a method based on British Standard 2782, Part 1, Method 102c. It was found that the addition of between 12 and 16 percent, by weight, of the petroleum jelly gave a polymer composition (of between 14 and 18 percent total lubricant content) having a softening point above 70° C whereas with two exceptions the addition of 12 percent or more of the remaining lubricants tested all gave compositions (of at least 14 percent total lubricant content) having softening points lower than 70° C; the softening point depression effect becoming disproportionally worse as the amount of added lubricant increased beyond 12 percent weight. The two exceptions were paraffin wax and microcrystalline wax. For example, paraffin wax gave compositions having only a slightly lower softening point than those containing the same weight of petroleum jelly. However, articles molded from compositions containing 12 percent or more, by weight, of paraffin wax did not give an acceptable performance when printed with the usual type of printing ink, while microcrystalline wax resulted in compositions which gave rise to delamination on molding. For these reasons paraffin wax and microcrystalline wax are unsuitable lubricant additives in the concentrations with which the present invention is concerned.

Tests were also carried out on all the above compositions in order to determine relationships between the processing viscosity of a composition and the percentage depression of its softening point. The processing viscosity at 30,000 seconds −1 was calculated from the flow curve obtained by measuring the flow properties of a composition on a capillary rheometer at 250° C with a flat entry die having a length to diameter ratio of 20:1. A similar pattern of performance emerged in that the addition of 12 percent, by weight, of petroleum jelly to the toughened polystyrene (its total lubricant content was therefore 14 percent wt.) reduced its processing viscosity to 55 percent of that of the toughened polystyrene starting material, although its softening point was still 75° C. In contrast, a 60°percent reduction in processing viscosity was only obtained with the conventional oil and ester type lubricants at softening points significantly below 70° C. It was also found that both paraffin wax and microcrystalline wax, and particularly the latter, had less of a beneficial effect on the processing viscosity than the conventional oil and ester lubricants, although as previously indicated paraffin wax and microcrystalline wax must also be rejected for other reasons.

Softening point and printability are taken as criteria of performance because they are of paramount importance to some manufacturers of thin-walled containers. In recent years an appreciable demand has arisen for such containers which are of good appearance, are strong yet light in weight, and which pose no toxicity problems to the user. Moreover, such containers should be capable of being manufactured at high speed by an economical process, and this latter requirement necessitates the use of injection molding as opposed to blow-molding which has been necessary hitherto for the production of articles having very thin wall sections. While such articles can be made from toughened polyvinyl-aromatic compounds in thin sheet form by blow-molding techniques, the latter are cumbersome from the operational point of view and economically do not compare favorably with injection molding. However, up to now the latter process has not been able to produce containers having very thin walls in view of the limitations imposed by the processing viscosities of the toughened polyvinyl-aromatic compounds used. In order to be able to use injection molding techniques for the manufacture of such articles, polymer compositions are required which have processing viscosities which are less than about 60 percent of the toughened polyvinyl-aromatic compounds hitherto available (the normal grades thereof containing 2 — 3 percent wt. of lubricant are referred to); this figure of 60 percent is accordingly taken as a processing viscosity criterion in this specification. The present invention provides a means of appreciably reducing the processing viscosity without deleterious affect on the printability properties of the polymer composition, and surprisingly, without unacceptable reduction in the softening point thereof. In the latter respect it is noted that containers after printing are stoved, i.e., baked, at an elevated temperature in order to dry the printing ink. For this reason a polymer composition having a softening point below 70° C cannot be regarded as being acceptable for use in the manufacture of containers that have to be printed upon; accordingly, 70° C is taken as a softening point criterion.

The excellent flow properties under injection molding conditions of the polymer compositions of the present invention enable one to use appreciably lower melt temperatures (for example, 200° C instead of 260° C is a typical reduction achievable using the present compositions) with consequential reductions in cycle time, for example, by up to one-third, as compared with that hitherto required for manufacturing thicker-walled articles by injection molding.

The toughened polyvinyl-aromatic compounds with which the present invention is concerned are those mady by polymerizing a vinyl-aromatic monomer or mixture thereof, together, if desired, with one or more other monomers copolymerizable therewith, for example, a vinylidene aromatic monomer or monomers, in the presence of an elastomer or mixture thereof.

The elastomers used in carrying out the present invention may be broadly described as synthetic elastomers prepared by polymerization of $C_4$–$C_6$ alphatic conjugated diolefin hydrocarbons such as 1,3 butadiene, isoprene, piperylene, and 2,3 dimethyl butadiene. Particularly preferred diene elastomers, include homopolymers such as polybutadiene, polyisoprene and copolymers of these dienes as well as copolymers with monovinyl-aromatic compounds such as conventional sytrene-butadiene rubber (SBR), Linear SBR and block copolymers of styrene and conjugated dienes such as S-B-S and tapered polymers such as S-SB-B (wherein S is a polymer block of homopolystyrene, B is a polymer block of homopolybutadiene and SB is a copolymer block of styrene and butadiene). Particularly preferred are elastomers prepared by solution polymerization by so-called Ziegler catalysis or by anionic initiation with organometallic compounds of alkali metals, e.g., hydrocarbyl compounds such as sec-butyl lithium and dilithio stilbene. A preferred elastomer is polybutadiene having a cis 1,4 content of at least 30 percent, e.g., 30 – 98 percent. Preferably the polybutadiene and styrene-butadiene elastomers have a Mooney viscosity (ML–4) in the range from about 30 to 80, a range between about 40 to 65 being particularly preferred. The Mooney viscosity may be determined according to ASTM standard D927–55T.

Initially the elastomer(s) can be dissolved in the monomer(s) in an amount which is advantageously between about 3 to 15 percent by weight and preferably between 5 and 10 percent by weight of the monomer, and polymerization can be carried out in any known or suitable manner to give the graft copolymer, i.e., the polyvinyl-aromatic component to the composition according to the invention. Suitable techniques are described for example in Netherlands Pat. application No. 6,714,754 and British Pat. No. 1,045,421. In accordance with the present invention, for example, 14 to 17 percent, by weight, of petroleum jelly can then be blended therewith. Preferably, the petroleum jelly is added to the reaction mixture prior to or during the polymerization; in such case the petroleum jelly can be added as a solution in the vinyl-aromatic monomer which is the preferred technique although it is also possible to add the petroleum jelly as a solution in a vaporizable hydrocarbon diluent such as toluene, ethylbenzene, xylene and the like capable of being removed by evaporation during polymerization. When the petroleum jelly is blended with the toughened polyvinyl-aromatic component after polymerization, the blending can be carried out in any known or suitable manner, for example, using a Banbury mixer or by "inline" blending i.e., by addition to the toughened polyvinyl-aromatic compound, together, if desired, with any other additive(s) it is desired to incorporate therein, prior to final processing into a particulate form, for example, in an extruder for supply as the final polymer composition to the plastics molding industry. When employing a Banbury mixer it may be advantageous to utilize a masterbatch technique.

If desired, a polymer composition in accordance with the present invention can contain further additives other than those added specifically as lubricants, for example, colorants and anti-static agents such as is known in the art. For example, the polymer compositions can contain up to 2 percent, preferably from 1 to 1.5 percent, by weight of an alkanolamide anti-static agent, for example, lauric diethanolamide, and in such case the upper limit to the amount of petroleum jelly (or petroleum jelly and mineral oil) which can be employed will usually be somewhat lower than in the absence of this type of anti-static agent in view of the effect of the latter on the softening point of the polymer composition; the lower limit remains at 13 percent by weight, of petroleum jelly or petroleum jelly and mineral oil.

Other additives may include up to about 1 percent by weight of antioxidants such as the alkyl aryl phosphates, e.g., Trisnonyl phenyl phosphate or hindered phenols.

The petroleum jelly lubricant used in carrying out the present invention does not induce screw slippage during the subsequent processing of the polymer composition in the amounts normally employed. The phenomenon of screw slippage during injection molding will be known to those in the art and need not be further elaborated. The use of a lubricant which is incompatible at the concentrations required, such as paraffin wax, induces screw slippage and is unsatisfactory. The amount of petroleum jelly used should be such that screw slippage does not occur to an unacceptable extent; usually this situation is achieved by an addition of petroleum jelly in amount which is between 14 and 17 percent, by weight of the ultimate polymer composition, and, in general, the upper limit of petroleum jelly (or petroleum jelly and mineral oil as referred to previously) employed in carrying out the present invention will usually be dictated by screw slippage and softening point considerations. Preferably a white petroleum jelly is used to avoid coloration of the plastic composition. A "synthetic" petroleum jelly which is formed from a microcrystalline wax in combination with an appropriate minor amount, for example, 2 to 10 percent, by weight, of a suitably fractionated mineral white oil having a volatility comparable with the oil content of petroleum jelly could be used, although such a mixture would normally be more expensive than a petroleum jelly per se; the addition of the microcrystalline wax alone does not give acceptable results. Adequate compatibility between the added petroleum jelly and the toughened polyvinyl-aromatic compound at extrusion melt temperatures is important and, while a low degree of screw slippage may be tolerable in some circumstances, slippage is undesirable since it increases processing times; any appreciable slippage results in uneconomic operation or, in the extreme, an unworkable polymer composition.

The present invention is illustrated with reference to the following examples:

EXAMPLE I

A polystyrene composition was prepared by mixing 86 parts by weight of a toughened polystyrene with 14 parts by weight of a petroleum jelly sold under the trade designation "Shell" White Petroleum Jelly B.P. The toughened polystyrene was one prepared by polymerizing styrene containing 7 percent, by weight, of a styrene-butadiene rubber. The mixing operation was carried out in a Banbury mixer, and the resulting composition was then converted into particulate form by extrusion into strands followed by cutting into small pieces (nibs).

Small, thin-walled cups measuring approximately 7 centimeters (c.m.) in height, 6.5 and 5 c.m. in top and bottom diameter respectively and 0.5 millimeters (c.m.m.) in wall thickness were molded on a Netstal "Rotomat" screw-plasticizing injection molding machine from this polystyrene composition and also, for comparative purposes, from the toughened polystyrene itself. The cups formed from the composition in accordance with the present invention showed exceptional resistance to breakage and they could be flattened and folded several times with little sign of breakage. In comparison the cups formed from toughened polystyrene without added lubricant readily cracked (in the direction of material flow during the molding operation) when crushed by hand. A quantitative assessment of these results was made by carrying out tensile tests on dumbell specimens cut, in a direction at right angles to the direction of material flow, form cups molded as described above; the results of these tests were as follows:

|  | Ultimate Elongation | Ultimate Stress | Energy to break |
|---|---|---|---|
| Cups molded from toughened polystyrene | 11% | 2,100 pounds per square inch | 6 foot pounds per square inch |
| Cups molded from composition containing petroleum jelly | 38% | 1,400 pounds per square inch | 14 foot pounds per square inch |

It will be seen that although the actual breaking strength of the toughened polystyrene has been reduced by the lubricant content, the resistance to cracking as shown by ultimate elongation has been markedly increased; this results in the noticeable improvement in the energy to break figures, which were obtained by integrating over the stress/strain relationship.

This example also illustrates the further advantage of improved flow characteristics obtainable in accordance with the present invention. It was found that whereas the toughened polystyrene had to be molded at 260° C and required a minimum cycle time of 5.2 seconds, the toughened polystyrene with 14 percent, by weight, of petroleum jelly could be molded at 200° C and required a cycle time of only 3.5 seconds. Its processing viscosity, as measured on a capillary rheometer at high shear rates, was approximately one-half of that of the unlubricated toughened polystyrene (i.e., 40 as compared with 77 poises); but suprisingly, its softening point was only 5° C lower. Softening point is determined by a method based on BS 2782, Part 1, Method 102C and tensile properties are determined in accordance with BS 2782, Method 301/f.

EXAMPLE II

By way of comparison to show the need to use as the base polymer a graft copolymer of an elastomer and a polyvinyl-aromatic compound, tests were carried out on three polymer compositions formed, respectively, by blending White Petroleum Jelly BP with (a) a homopolystyrene, i.e., crystal polystyrene, (b) a toughened polystyrene formed by interpolymerization of styrene and polybutadiene rubber and containing 2 percent, by weight of inherent lubricant and (c) a toughened polystyrene formed by blending crystal polystyrene with the same amount of the same polybutadiene rubber as was present in the toughened polystyrene of composition (b). A number of the physical properties of these compositions when molded into containers as described in Example I were determined and are indicated in the table below. In order to provide a comparison between the three compositions (a, b and c) containing petroleum jelly and a composition containing no added lubricant, the table also includes data in respect of the toughened polystyrene (with 2 percent, by weight, of inherent lubricant) used to form composition (b); this data is included under the heading (d).

The hand brittleness rating referred to in the table was carried out by crushing a container in the hand and assigning it a rating from 1 to 10, a rating of 1 corresponding to a flexibility which permitted crushing to the maximum possible extent without fracture occurring and a rating of 10 corresponding to a degree of brittleness such that the container cracked substantially as soon as hand pressure was applied. The tensile test, flow properties test and softening point determination were carried out as described in Example I.

|  | Plastic Composition | | | |
|---|---|---|---|---|
|  | (a) | (b) | (c) | (d) |
| Petroleum Jelly Content | 12% wt. | 14% wt. | 16%wt. | None |
| Softening point | 75°C | 75°C | 74°C | 96°C |
| Processing viscosity | 61 poises | 55 poises | 62 poises | 98 poises |
| Hand-brittleness rating | 9 | 2 | 6–7 | 6–8 |
| Ultimate elongation | 5% (broke at yield) | 40% | 4% (broke at yield) | 20% |
| Ultimate stress (foot pounds per square inch) | 2890 (broke at yield) | 1530 | 910 (broke at yield) | 2590 |

Although composition (b), which is in accordance with the present invention, contained a somewhat higher petroleum jelly content than composition (a), the marked difference in brittleness and strength properties will be apparent. Surprisingly also, composition (c) in which the rubber is present in physical admixture showed markedly inferior brittleness and strength properties despite a somewhat higher petroleum jelly content than composition (b). The processing viscosity of composition (b) was also appreciably below that of either composition (a) or (c), while its softening point is high enough to be acceptable to the end-user.

EXAMPLE III

A number of polymer compositions in accordance with the present invention were formed by blending one or other of two toughened polystyrenes (A or B) of the kind defined and containing 3 percent and 2 percent of mineral oil respectively with various amounts of White Petroleum Jelly BP (WPJ). These compositions were tested as indicated in the previous examples and the following results were obtained:

|  | Toughened Polystyrene A | | Toughened Polystyrene B | |
|---|---|---|---|---|
|  | 3% oil no WPJ | 3% oil + 10% WPJ | 2% oil no WPJ | 2% oil + 14% WPJ |
| Softening Point | 87.5°C | 73°C | 96°C | 75°C |
| Processing viscosity | 95 poises | 54 poises | 98 poises | 55 poises |
| Hand brittleness rating | 8–9 | 3–4 | 6–8 | 2 |
| Ultimate elongation | 4% (broke at yield) | 26% | 20% | 40% |
| Ultimate stress (foot pounds per square inch) | 2950 | 1580 | 2590 | 1530 |

EXAMPLE IV

To show the effect of at least 14 percent, by weight, of conventional lubricants on both the processing viscosity and the softening point of a toughened polystyrene of the kind defined a large number of compositions were prepared by blending the toughened polystyrene B of Example III (containing 2 percent wt. of lubricant already) with various amounts of "Risella" Oil 33 (a white mineral oil), butyl stearate, stearyl stearate, dicyclohexyl phthalate and palm kernal oil and the processing viscosity and the softening point (expressed as a percentage of the processing viscosity and the softening point of the starting toughened polystyrene) was determined for a series of total lubricant concentrations. For comparison similar determinations were made on compositions obtained by blending the same toughened polystyrene with various amounts of White Petroleum Jelly BP. The following results in respect of 14 percent and 17 percent of added lubricant, i.e., a total lubricant concentration of 12 percent and 15 percent respectively, can be quoted from among the many results obtained to show the difference in the effect on processing viscosity and softening point obtained when using petroleum jelly:

| Added Lubricant | 14% wt. total lubricant | | 17% wt. total lubricant | |
|---|---|---|---|---|
|  | Processing Viscosity | Softening Point | Processing Viscosity | Softening Point |
| "Risella" oil | 62% | 73% | 55% | 69% |
| Butyl stearate | 56% | 54% | 48% | 42% |
| Stearyl stearate | 56% | 70% | 48% | 67% |
| Palm kernel oil | 59% | 63% | 52% | 57% |
| Dicyclohexyl phthalate | 66% | 70% | 60% | 65% |
| Petroleum jelly | 57% | 79% | 47% | 77% |

The softening point of the toughened polystyrene containing an inherent 2 percent wt. of lubricant was 94° C from which it can readily be calculated that the acceptable minimum softening point of 70° C represents 75 percent of the softening point of the toughened polystyrene starting material. All the compositions referred to in the above table therefore had softening points below the acceptable minimum with the exception of those formed from petroleum jelly. As regards processing viscosity it will be seen that the addition of petroleum jelly gives a significant reduction in this respect, and that at both concentrations, namely 12 percent and 15 percent wt., of added petroleum jelly the processing viscosity is better than the previously-mentioned objective of 60 percent of that of the starting toughened polystyrene.

EXAMPLE V

The toughened polystyrene containing an inherent 2 percent wt. of lubricant referred to in Example IV was blended with 11 percent by weight of Shell White Petroleum Jelly BP. The resulting polymer composition, which contained 13 percent by weight of total lubricant additive, had a softening point of 76° C and its processing viscosity was only 60 percent of that of the toughened polystyrene starting material.

EXAMPLE VI

A polystyrene composition in accordance with the present invention was formed by inter-polymerizing a mixture of styrene monomer, styrene/butadiene rubber available under the trade designation "Cariflex" S-1006 and a lubricant additive comprising Shell White Petroleum Jelly BP and Lobitos WA1 white oil, the amount of lubricant being 14 percent by weight of the ultimate polymer product. The lubricant additive comprised 75 percent of the petroleum jelly and 25 percent of the white oil, the percentages being by weight. Polymerization was carried out at 115° C with stirring to a conversion of about 25 percent, followed by can polymerization at 180° C to form the finished product.

A similar product was also made by interpolymerization using 14 percent, by weight, of petroleum jelly in place of the petroleum jelly and oil; and for comparative purposes a composition was made in the same manner using 14 percent by weight of the oil but no petroleum jelly. The physical properties of these various compositions are given below:

|  | Plastic Composition | | |
|---|---|---|---|
|  | 1 | 2 | 3 |
| Petroleum jelly content | 10.5% wt. | 14% wt. | None |
| Oil content | 3.5% wt. | None | 14% wt. |
| Softening Point | 75°C | 71.5°C | 67°C |
| Processing Viscosity | 53 poises | 52 poises | 51 poises |

I claim as my invention:

1. A composition having improved flow properties and impact strength comprising: (1) a graft copolymer of at least one monovinyl-aromatic compound having the vinyl group attached directly to a carbon atom of the aromatic nucleus and a synthetic elastomeric butadiene polymer in an amount of said elastomeric polymer between about 3 to 15 percent by weight on graft copolymer and (2) from 13 to 17 percent by weight on said composition of a lubricant selected from petroleum jelly and petroleum jelly together with up to 40 percent by weight on petroleum jelly of a mineral oil.

2. A composition as in claim 1 wherein the monovinyl-aromatic compound is styrene.

3. A composition as in claim 1 wherein said elastomer is a styrene-butadiene rubber.

4. A composition as in claim 1 wherein the amount of lubricant is at least 14 percent by weight.

5. A composition as in claim 1 wherein the lubricant is petroleum jelly.

6. A composition as in claim 1 wherein said elastomer is polybutadiene.

* * * * *